(12) United States Patent
Panikkar et al.

(10) Patent No.: US 12,182,818 B2
(45) Date of Patent: Dec. 31, 2024

(54) ORDER PROCESSING BASED ON PREDICTED DELAY TIME TO INCREASE LIKELIHOOD OF ORDER FULFILLMENT WITHIN AN AUTHORIZATION PERIOD

(71) Applicant: Dell Products L.P., Round Rock, TX (US)

(72) Inventors: Shibi Panikkar, Bangalore (IN); Ravuru Vijaya Sankar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 48 days.

(21) Appl. No.: 18/111,180

(22) Filed: Feb. 17, 2023

(65) Prior Publication Data
US 2024/0281814 A1   Aug. 22, 2024

(51) Int. Cl.
*G06Q 20/40* (2012.01)
*G06Q 20/38* (2012.01)

(52) U.S. Cl.
CPC ....... *G06Q 20/4016* (2013.01); *G06Q 20/389* (2013.01)

(58) Field of Classification Search
CPC .......... G06Q 20/389; G06Q 20/4016
See application file for complete search history.

(56) References Cited

U.S. PATENT DOCUMENTS

| | | | | |
|---|---|---|---|---|
| 8,386,377 B1* | 2/2013 | Xiong | .................... | G06Q 20/04 707/706 |
| 2002/0026328 A1* | 2/2002 | Westerkamp | .......... | G16H 40/20 705/2 |
| 2019/0213509 A1* | 7/2019 | Burleson | ................ | G06N 20/00 |
| 2022/0027915 A1* | 1/2022 | Cameron | ................ | G06Q 20/12 |
| 2022/0036361 A1* | 2/2022 | Johnson | ........... | G06Q 20/40145 |
| 2023/0034172 A1* | 2/2023 | Kumar | .................... | G06F 16/284 |
| 2023/0043702 A1* | 2/2023 | Sells | ...................... | G06Q 40/03 |
| 2023/0169612 A1* | 6/2023 | Liguori | .................. | G06N 20/00 705/15 |

OTHER PUBLICATIONS

P. Hall et al., "Methods for Estimating a Conditional Distribution Function," Journal of the American Statistical Association, Mar. 1999, 23 pages.

(Continued)

*Primary Examiner* — Scott C Anderson
(74) *Attorney, Agent, or Firm* — Ryan, Mason & Lewis, LLP

(57) ABSTRACT

An apparatus comprises a processing device configured to identify a given order for products to be manufactured by an entity, the given order being associated with an authorization period specifying a time in which the given order is to be fulfilled by the entity to initiate capture of blocked funds of a customer that placed the given order. The processing device is also configured, responsive to determining that the given order has at least a threshold likelihood of being delayed utilizing a first machine learning model, to predict a delay time of the given order utilizing a second machine learning model. The processing device is further configured, responsive to determining that the predicted delay time of the given order will result in the given order being fulfilled outside of its associated authorization period, to initiate action to reduce the predicted delay time or extend the authorization period.

20 Claims, 11 Drawing Sheets

(56) References Cited

OTHER PUBLICATIONS

M. H. Nasr et al., "E-Payment Systems Risks, Opportunities and Challenges for Improved Results in E-Business," International Journal of Intelligent Computing and Information Science, vol. 20, No. 1, Jun. 2020, pp. 16-27.

S. Salcedo-Sanz et al., "Support Vector Machines in Engineering: An Overview," WIREs Data Mining and Knowledge Discovery, Apr. 28, 2014, 37 pages.

* cited by examiner ns of an exemplary process for order
ORDER PROCESSING BASED ON PREDICTED DELAY TIME TO INCREASE LIKELIHOOD OF ORDER FULFILLMENT WITHIN AN AUTHORIZATION PERIOD

FIELD

The field relates generally to information processing, and more particularly to techniques for order management.

BACKGROUND

Payment collection is an important aspect of various business models. Payment capture techniques may vary from business to business in different organizations. In some cases, payment capture is immediate at the time an order is placed. In other cases, payment capture is delayed relative to the time an order is placed. When delayed payment capture is used, the order is authorized using some type of payment processor which will block or set aside customer funds for the order for a specific duration of time referred to as an authorization window or authorization period. If an order cannot be fulfilled within the authorization window or authorization period, the customer funds which were blocked or set aside by the payment processor are released.

SUMMARY

Illustrative embodiments of the present invention provide techniques for order processing based on predicted delay time to increase likelihood of order fulfillment within an authorization period.

In one embodiment, an apparatus comprises at least one processing device comprising a processor coupled to a memory. The at least one processing device is configured to identify a given order for one or more products to be manufactured by an entity, the given order being associated with an authorization period specifying a time in which the given order is to be fulfilled by the entity to initiate capture of blocked funds of a customer that placed the given order. The at least one processing device is also configured to determine whether the given order has at least a threshold likelihood of being delayed utilizing a first machine learning model and, responsive to the given order having at least the threshold likelihood of being delayed, to predict a delay time of the given order utilizing a second machine learning model. The at least one processing device is further configured to determine whether the predicted delay time of the given order will result in the given order being fulfilled outside of its associated authorization period and, responsive to determining that the predicted delay time of the given order will result in the given order being fulfilled outside of its associated authorization period, to initiate one or more actions to at least one of reduce the predicted delay time of the given order and extend the authorization period associated with the given order.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
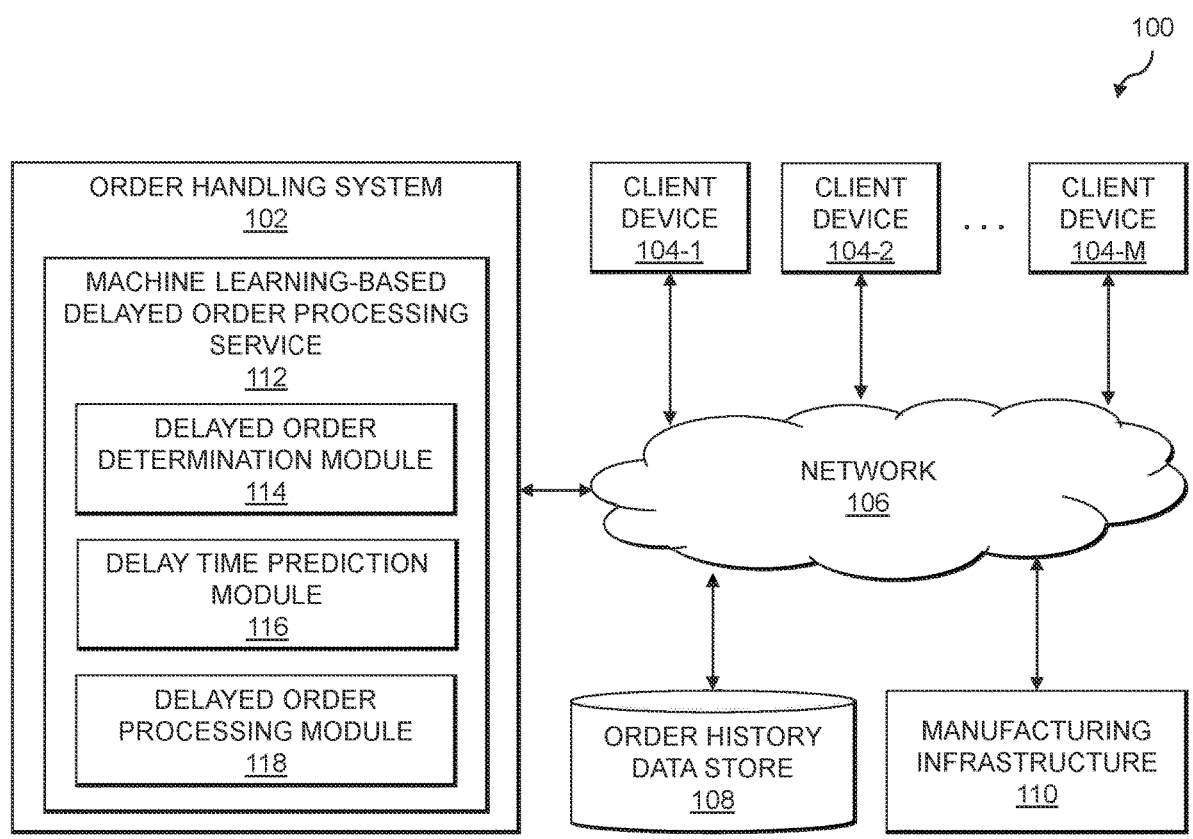
FIG. 1 is a block diagram of an information processing system configured for order processing based on predicted delay time to increase likelihood of order fulfillment within an authorization period in an illustrative embodiment of the invention.

FIG. 1 shows an information processing system 100 configured in accordance with an illustrative embodiment to provide functionality for order processing based on predicted delay time to increase likelihood of order fulfillment within an authorization period. The information processing system 100 includes an order handling system 102 and a plurality of client devices 104-1, 104-2, . . . 104-M (collectively client devices 104). The order handling system 102 and client devices 104 are coupled to a network 106. Also coupled to the network 106 is an order history data store 108, which may store various information relating to historical delayed orders and machine learning (ML) models used for predicting the delay time for orders. The order handling system 102 is assumed to be associated with manufacturing infrastructure 110 also coupled to the network 106. The manufacturing infrastructure 110 includes various equipment for manufacturing products or items which are ordered by users of the client devices 104 with the order handling system 102. In some cases, the products or items comprise information technology (IT) assets, such as physical computing resources including physical hardware such as servers, storage systems, networking equipment, Internet of Things (IoT) devices, other types of processing and computing devices including desktops, laptops, tablets, smartphones, etc. The IT assets may also be provisioned with various software components.

The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The order history data store 108, as discussed above, is configured to store and record information relating to historical orders which are fulfilled by the order handling system 102 using the manufacturing infrastructure 110, including historical orders which are delayed. The order history data store 108 may also store information relating to the order history and other characteristics of different customers (e.g., users of the client devices 104) which have placed orders with the order handling system 102. The order history data store 108 may also store machine learning (ML) models or various configuration information for ML models which are used by a ML-based delayed order processing service 112 implemented by the order handling system 102. The order history data store 108 in some embodiments is implemented using one or more storage systems or devices associated with the order handling system 102. In some embodiments, one or more of the storage systems utilized to implement the order history data store 108 comprises a scale-out all-flash content addressable storage array or other type of storage array.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the order handling system 102 and the ML-based delayed order processing service 112, as well as to support communication between the order handling system 102, the ML-based delayed order processing service 112, and other related systems and devices not explicitly shown.

In some embodiments, the client devices 104 are configured to access or otherwise utilize the order handling system 102 to place orders which are to be fulfilled at least in part utilizing the manufacturing infrastructure 110. The order handling system 102 and the manufacturing infrastructure 110 may be operated by a business, entity or other enterprise. In such cases, the client devices 104 may be associated with a sales team, support personnel, system administrators, IT managers or other authorized personnel or users configured to access and utilize the ML-based delayed order processing service 112 and the order handling system 102 to intelligently determine when orders are predicted to be delayed and for taking various actions for processing such delayed orders to reduce or minimize the number of delayed orders which are not fulfilled within their associated authorization periods. For example, a given one of the client devices 104 may be used to access a graphical user interface (GUI) provided by the order handling system 102 to place an order for one or more products or items that are to be produced using the manufacturing infrastructure 110, to receive information regarding whether the order is predicted to be delayed beyond its associated authorization period, and to intelligently initiate re-authorization of the authorization period for the order that is predicted to be delayed beyond its associated authorization period.

The term "user" herein is intended to be broadly construed so as to encompass numerous arrangements of human, hardware, software or firmware entities, as well as combinations of such entities.

The ML-based delayed order processing service 112 may be provided as a cloud service accessible by the client devices 104. In some embodiments, the client devices 104 may implement host agents that are configured for automated transmission of information regarding orders to the ML-based delayed order processing service 112, and to automatically receive information relating to whether the orders are predicted to be delayed as well as to initiate action to mitigate the risk that orders are delayed beyond their associated authorization periods (e.g., including "swapping" of items or products between delayed orders and other lower priority orders being handled by the manufacturing infrastructure 110, initiating re-authorization or new authorization for delayed orders, etc.). It should be noted that a "host agent" as this term is generally used herein may comprise an automated entity, such as a software entity running on a processing device. Accordingly, a security agent or host agent need not be a human entity.

As shown in FIG. 1, the order handling system 102 comprises the ML-based delayed order processing service 112. As will be described in further detail below, the ML-based delayed order processing service 112 is configured to utilize machine learning for automatically determining whether orders are predicted to be delayed, for predicting the amount of time that orders will be delayed, and for processing delayed orders in order to reduce the chances that delayed orders are shipped or otherwise fulfilled outside their associated authorization periods. Although shown as an element of the order handling system 102 in this embodiment, the ML-based delayed order processing service 112 in other embodiments can be implemented at least in part externally to the order handling system 102, for example, as a stand-alone server, set of servers or other type of system coupled to the network 106. In some embodiments, the ML-based delayed order processing service 112 may be implemented at least in part within one or more of the client devices 104.

The ML-based delayed order processing service 112 is assumed to be implemented using at least one processing device. Each such processing device generally comprises at least one processor and an associated memory, and implements one or more functional modules for controlling certain features of the ML-based delayed order processing service 112. In the FIG. 1 embodiment, the ML-based delayed order processing service 112 comprises a delayed order determination module 114, a delay time prediction module 116, and a delayed order processing module 118. The delayed order determination module 114 is configured to analyze orders (e.g., at the time they are placed) to determine whether they are at risk of becoming delayed orders, and can also monitor progress of orders to determine whether an order is at risk of becoming delayed at various stages of the order fulfillment process. The delay time prediction module 116 is configured to predict the amount of time that orders will be delayed (e.g., including various types of delay such as manufacturing order planning delays, manufacturing delays, burn software delays, testing delays, delays resulting from fixes which are applied in response to failed tests, delays resulting from re-burning software and re-testing following application of fixes, etc.).

The delayed order processing module 118 is configured to take various action to reduce the risk that delayed orders will be shipped outside of their associated authorization periods. Each order is assumed to be associated with an authorization period (e.g., where funds are blocked or otherwise set aside by a payment processor or gateway for payment capture following shipment of the order). If the predicted delay time for a given delayed order results in the given delayed order falling outside its authorization period, the delayed order processing module 118 can take various actions to attempt to fulfill the given delayed order within its authorization period. Such action may include, for example, "swapping" items or products in the given delayed order with one or more other "lower priority" orders (e.g., orders having the same items/products or components thereof which have longer remaining time in their associated authorization periods). Such action may also include, if suitable lower priority orders cannot be found, initiating re-authorization or new authorization with the customer of the given delayed order (e.g., to extend its authorization period). If the re-authorization or new authorization is not successful (e.g., due to not receiving customer consent, due to the customer denying consent, etc.), then the action may include determining a riskiness of the customer associated with the given delayed order and determining whether to cancel the given delayed order or fulfill the given delayed order outside its authorization period accordingly.

It is to be understood that the particular set of elements shown in FIG. 1 for order processing based on predicted delay time to increase likelihood of order fulfillment within an authorization period is presented by way of illustrative example only, and in other embodiments additional or alternative elements may be used. Thus, another embodiment may include additional or alternative systems, devices and other network entities, as well as different arrangements of modules and other components.

It is to be appreciated that the particular arrangement of the order handling system 102, the ML-based delayed order processing service 112, the delayed order determination module 114, the delay time prediction module 116 and the delayed order processing module 118 illustrated in the FIG. 1 embodiment is presented by way of example only, and alternative arrangements can be used in other embodiments. As discussed above, for example, the order handling system 102, the ML-based delayed order processing service 112, the delayed order determination module 114, the delay time prediction module 116 and the delayed order processing module 118 may in some embodiments be implemented internal to one or more of the client devices 104. As another example, the functionality associated with the delayed order determination module 114, the delay time prediction module 116 and the delayed order processing module 118 may be combined into one module, or separated across more than three modules with the multiple modules possibly being implemented with multiple distinct processors or processing devices.

At least portions of the ML-based delayed order processing service 112 (e.g., the delayed order determination module 114, the delay time prediction module 116 and the delayed order processing module 118) may be implemented at least in part in the form of software that is stored in memory and executed by a processor.

The ML-based delayed order processing service 112, and other portions of the system 100, may in some embodiments be part of cloud infrastructure as will be described in further detail below. The cloud infrastructure hosting the ML-based delayed order processing service 112 may also host any combination of the order handling system 102, one or more of the client devices 104, the order history data store 108, the manufacturing infrastructure 110, etc.

The ML-based delayed order processing service 112, and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 104 and the ML-based delayed order processing service 112, or components thereof (e.g., the delayed order determination module 114, the delay time prediction module 116, and the delayed order processing module 118) may be implemented on respective distinct processing platforms, although numerous other arrangements are possible. For example, in some embodiments at least portions of the ML-based delayed order processing service 112 and one or more of the client devices 104 are implemented on the same processing platform. A given client device (e.g., 104-1) can therefore be implemented at least in part within at least one processing platform that implements at least a portion of the ML-based delayed order processing service 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104 and the ML-based delayed order processing service 112, or portions or components thereof, to reside in different data centers. Numerous other distributed implementations are possible. The ML-based delayed order processing service 112 can also be implemented in a distributed manner across multiple data centers.

Additional examples of processing platforms utilized to implement the ML-based delayed order processing service 112 in illustrative embodiments will be described in more detail below in conjunction with FIGS. 10 and 11.

It is to be appreciated that these and other features of illustrative embodiments are presented by way of example only and should not be construed as limiting in any way.

An exemplary process for order processing based on predicted delay time to increase likelihood of order fulfillment within an authorization period will now be described in more detail with reference to the flow diagram of FIG. 2. It is to be understood that this particular process is only an example, and that additional or alternative processes for order processing based on predicted delay time to increase likelihood of order fulfillment within an authorization period can be carried out in other embodiments.

In this embodiment, the process includes steps 200 through 208. These steps are assumed to be performed by the ML-based delayed order processing service 112 utilizing the delayed order determination module 114, the delay time prediction module 116 and the delayed order processing module 118. The process begins with step 200, identifying a given order for one or more products to be manufactured by an entity. The given order is associated with an authorization period specifying a time in which the given order is to be fulfilled by the entity to initiate capture of blocked funds of a customer that placed the given order. The one or more products may comprise one or more computing devices.

In step 202, a determination is made as to whether the given order has at least a threshold likelihood of being delayed utilizing a first machine learning model. The first machine learning model may be trained utilizing delayed order history information characterizing one or more of order type, shipment location, country of manufacturing factory, and delay codes. Determining whether the given order has at least the threshold likelihood of being delayed may be based at least in part on determining delay attributed to issues relating to at least one of manufacturing order planning and manufacturing. Determining whether the given order has at least the threshold likelihood of being delayed may also or alternatively be based at least in part on determining delay attributed to testing of the one or more products manufactured by the entity. The delay attributed to the testing of the one or more products manufactured by the entity may comprise delays associated with electro-mechanical repair of one or more issues identified during the testing of the one or more products manufactured by the entity. The delays associated with the electro-mechanical repair of the one or more issues may be based at least in part on at least one of electro-mechanical repair failure type, electro-mechanical repair resource availability, skill set of users performing the electro-mechanical repair, and a number of products in an electro-mechanical repair queue.

A delay time of the given order is predicted utilizing a second machine learning model in step 204, responsive to the step 202 determination indicating that the given order has at least the threshold likelihood of being delayed. The second machine learning model may utilize (i) a support vector machine algorithm for classifying of the given order based at least in part on product, electro-mechanical repair task, one or more error codes, and time taken factors and (ii) conditional probability analysis for determining electro-mechanical repair time deviation based at least in part on a number of electro-mechanical repair tasks in the electro-mechanical repair queue.

In step 206, a determination is made as to whether the predicted delay time of the given order will result in the given order being fulfilled outside of its associated authorization period. One or more actions are initiated in step 208, responsive to determining that the predicted delay time of the given order will result in the given order being fulfilled outside of its associated authorization period, to at least one of reduce the predicted delay time of the given order and extend the authorization period associated with the given order. Step 208 may include attempting at least one action to reduce the predicted delay time prior to attempting at least one action to extend the authorization period associated with the given order. The at least one action to reduce the predicted delay time may comprise swapping one or more products of the given order with one or more similar products in one or more additional orders having associated authorization periods which end later than the authorization period of the given order. The at least one action to reduce the predicted delay time may comprise swapping, in an electro-mechanical repair queue, an ordering of one or more electro-mechanical repair tasks of the given order with one or more electro-mechanical repair tasks of one or more additional orders having associated authorization periods which end later than the authorization period of the given order. The at least one action to extend the authorization period associated with the given order may comprise requesting consent from the customer of the given order to extend the authorization period of the given order.

Figure 2:
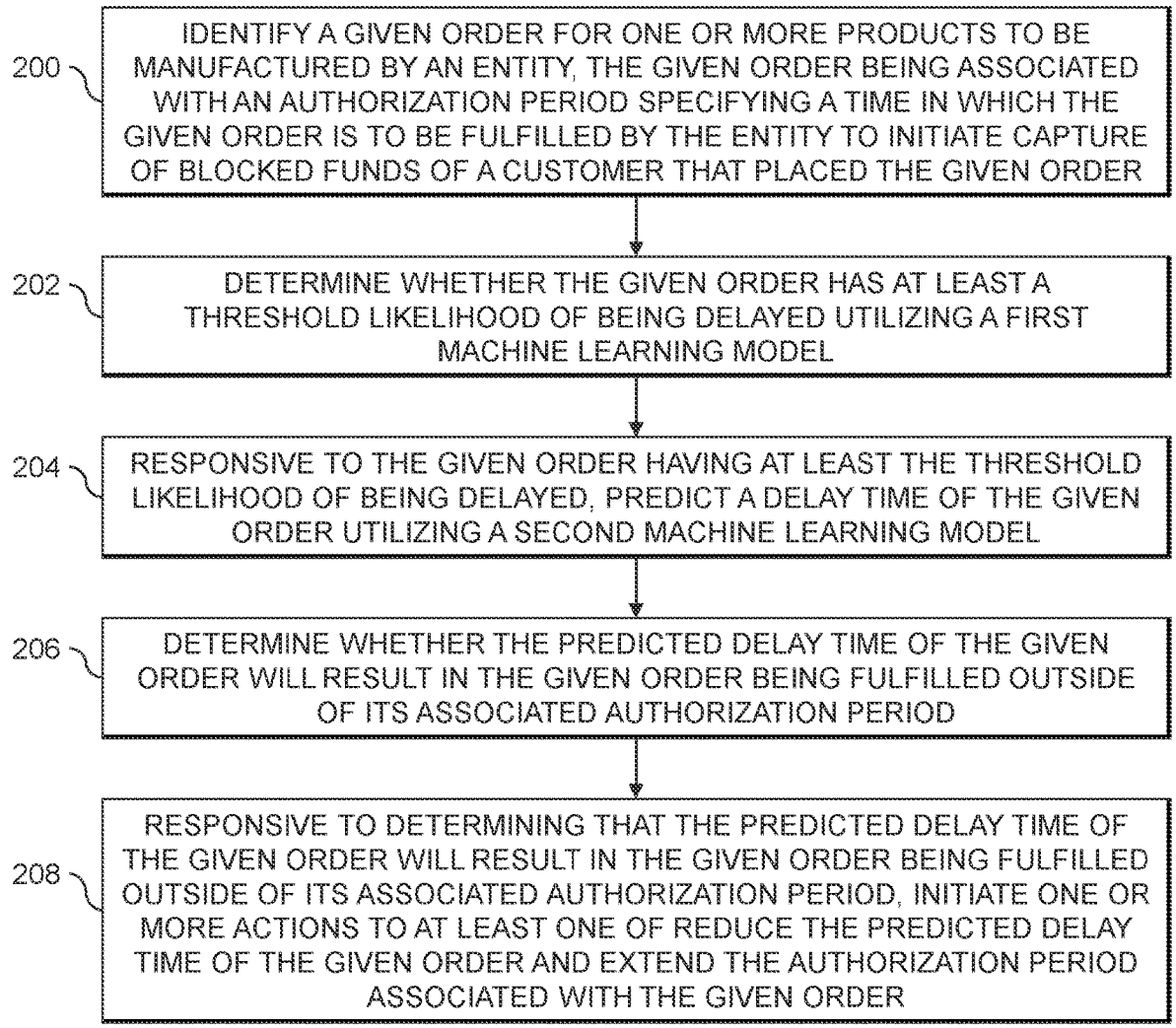
FIG. 2 is a flow diagram of an exemplary process for order processing based on predicted delay time to increase likelihood of order fulfillment within an authorization period in an illustrative embodiment.

Responsive to failure of the one or more actions to at least one of reduce the predicted delay time and extend the authorization period associated with the given order, the FIG. 2 process may further include utilizing a third machine learning model for classifying a riskiness of the customer based at least in part on the customer's order history with the entity. Responsive to the classified riskiness of the customer being a first risk level, the given order may be canceled. Responsive to the classified riskiness of the customer being a second risk level, the given order may be fulfilled outside its associated authorization period.

Payment collection is not only a form of capital flow, but is also part of a business model in sales. Payment capture varies from business to business in different organizations. Capturing of customer funds may be immediate or delayed. Consider the case of delayed payment capture, where the customer will select the products to buy and choose a payment method such as credit card/online payment processor (e.g., PayPal) and submits an order. The order will be authorized or honored by a financial institution (e.g., a bank). The financial institution will block the customer's funds for a specific duration (e.g., an "honor window" which is an example of what is more generally referred to herein as an authorization window or authorization period). The customer cannot use the blocked funds for other purposes during the honor window. The authorization places a hold on the funds, and is valid for some designated period of time (e.g., 29 days). After a successful authorization, the online payment processor may recommend that an entity captures funds within the honor period. Success of the payment capture is subject to risk and availability of funds on the authorized funding instrument. For a given entity, for example, the honor period may be 10 days. Within the 10-day honor period, the given entity must capture the funds by transferring funds from the customer's account to an account of the given entity.

Entities such as large manufacturing service organizations first acknowledge orders by sending a communication to the customer (e.g., via email) when the order is submitted. The next step is payment authorization, where the customer funds are blocked for a specific time period. In the case of some online payment processors, the funds are blocked for 10 days. During the order submission, the manufacturing service organization obtains customer consent for this fund blocking (e.g., as part of the terms and conditions agreed to by the customer when submitting the order). Within the honor period of 10 days, the order must be shipped and payment capture must be triggered to transfer the funds from the customer account to the manufacturing service organization's account. There is a legal obligation on payment capture, which must be triggered only after the ordered products get shipped. It should be noted that the authorization process may vary based on the payment type (e.g., credit card, debit card, etc.), and different authorization processes may have different honor windows. The honor window is an example of what is more generally referred to herein as the authorization window or authorization period.

In some respects, capturing the funds immediately after an order is placed is advantageous. There are, however, various benefits and advantages for an enterprise that uses delayed capture of payment. Such benefits include, but are not limited to: customer validation; fraud checking; trade compliance checking; providing lead time for shipment and invoicing (e.g., it takes time to manufacture products, ship the products and capture funds once the products are shipped as per legal obligations). Generally, an invoice is created after the order is shipped and payment capture is successful. Thus, delayed payment capture may be desired for various manufacturing service organizations or enterprises in the industry, as such enterprises can trigger payment capture within the authorization period to transfer funds from customer accounts to enterprise accounts.

There are various technical challenges with delayed payment capture for certain enterprises in the manufacturing service industry (and other industries). Such technical challenges include dealing with part shortages, factory capacity constraints, factory floor issues (e.g., labor issues, equipment failure, etc.), and failures in testing and repair time (e.g., Electro Magnetic Repair (EMR)). Due to any of these or other reasons, if the shipment of an order gets delayed beyond the authorization period (e.g., beyond 10 days), the funds which are blocked in the customer account will get unblocked automatically. The customer can then use these funds for other purposes. Once the enterprise sorts out the issues which caused the delay and gets the products shipped after the authorization period has expired, payment capture is then triggered. The payment capture, however, may fail due to the expired authorization period, insufficient funds, etc. The end result may be that the customer receives the ordered products without transferring payment to the enterprise account. In this scenario, an enterprise's collection team (e.g., which may be a third-party collection agency) will follow up with the customer to obtain payment. Some customers will not respond or agree to pay, resulting in write-offs where the enterprise loses money. A manufacturing service enterprise, for example, may lose millions yearly in write-offs for various payment types.

In some cases, the predominant delay in orders which results in the orders being "payment risk orders" are factors such as: failures in testing; re-burning time; and re-testing time. If these factors can be mitigated, then the percentage of orders which are payment risk orders can be drastically reduced which minimizes revenue loss for the enterprise to a great extent. In illustrative embodiments, technical solutions are provided which enable determination of which orders are (or are likely to become) payment risk orders. The technical solutions can intelligently predict the payment risk orders, and re-prioritize such payment risk orders by shuffling them with existing lower priority orders. This helps to ship and capture funds for the payment risk orders before their associated authorization periods expire. Further, the technical solutions are able to determine when payment risk orders cannot be swapped with lower priority orders, and to take other action to reduce the risk of revenue loss. Such other action may include re-authorizing or creating a new authorization with the payment processor (e.g., thereby renewing or extending the authorization period) in accordance with any applicable rules and regulations.

Different payment gateways have different rules for re-authorization based on the payment type. In a given context, a new authorization may be triggered with, for example, an online payment provider (e.g., PayPal) which will extend the authorization period (e.g., for another 10 days). This is not a straightforward approach, however, and raises various issues such as: since the enterprise is blocking customer funds again and extending the block period, customer consent is needed to re-authorize and extend the authorization period; determining an optimal time for reauthorization; determining what to do if the customer does not respond (e.g., to the request to extend the authorization period); determining what to do if the customer denies giving consent for reauthorization; determining what to do if the reauthorization fails again; determining how to reduce or minimize the revenue impact to the enterprise in the above scenarios; etc. Getting customer consent for reauthorization is not well followed practice in the industry, because of the difficulties in obtaining customer consent.

The technical solutions described herein provide a system for mitigating order delays, such as EMR testing delayed orders, which is a major delay resulting in payment risk orders. The technical solutions also provide an intelligent reauthorization mechanism with intelligent decision-making to reduce the payment risk orders and minimize revenue impacts to an enterprise.

Organizations, enterprises and other entities enjoy getting paid, and various payment methods (e.g., online payment processors such as PayPal) make the process quicker. While instant payments may be ideal for most entities, some entities require special payment arrangements and a flexible system that enables them to collect funds in a way that makes sense for their business model. For some business types, instant payments do not fit the type of transaction taking place—for both the business and the customer. Fortunately, various payment processors allow businesses to authorize payment and collect customer funds using a delayed capture. When an organization authorizes the customer's order amount, the customer's funds will be blocked for a certain period referred to herein as the "authorization window" or "authorization period." For example, in the case of some online payment processors the authorization period is 10 days. During the authorization period, the customer will not be able to use the blocked funds. The organization needs to capture the funds before the authorization period ends, or else the customer can use the blocked funds for some other purpose. In some industries, organizations are typically able to comply with this common practice as they trigger the payment capture and create an invoice within the appropriate authorization period. For other industries, however, this practice is not ideal.

Consider, as an example, an enterprise that manufactures goods such as computing devices. The manufacturing process used by such an enterprise may not result in issues for most of the orders it receives, as most orders may fall in the category of Build to Stock (BTS) and some portion of Build to Order (BTO) to just assemble one or a few parts. Issues may arise, however, the case of Configure to Order (CTO) where the manufacturing and testing processes are lengthy and time-consuming which results in orders being delayed. This can result in an invoice being raised after the shipment notification. Some enterprises use Advance Shipment Notification (ASN) to raise the invoice and relieve the inventory.

Figure 3:
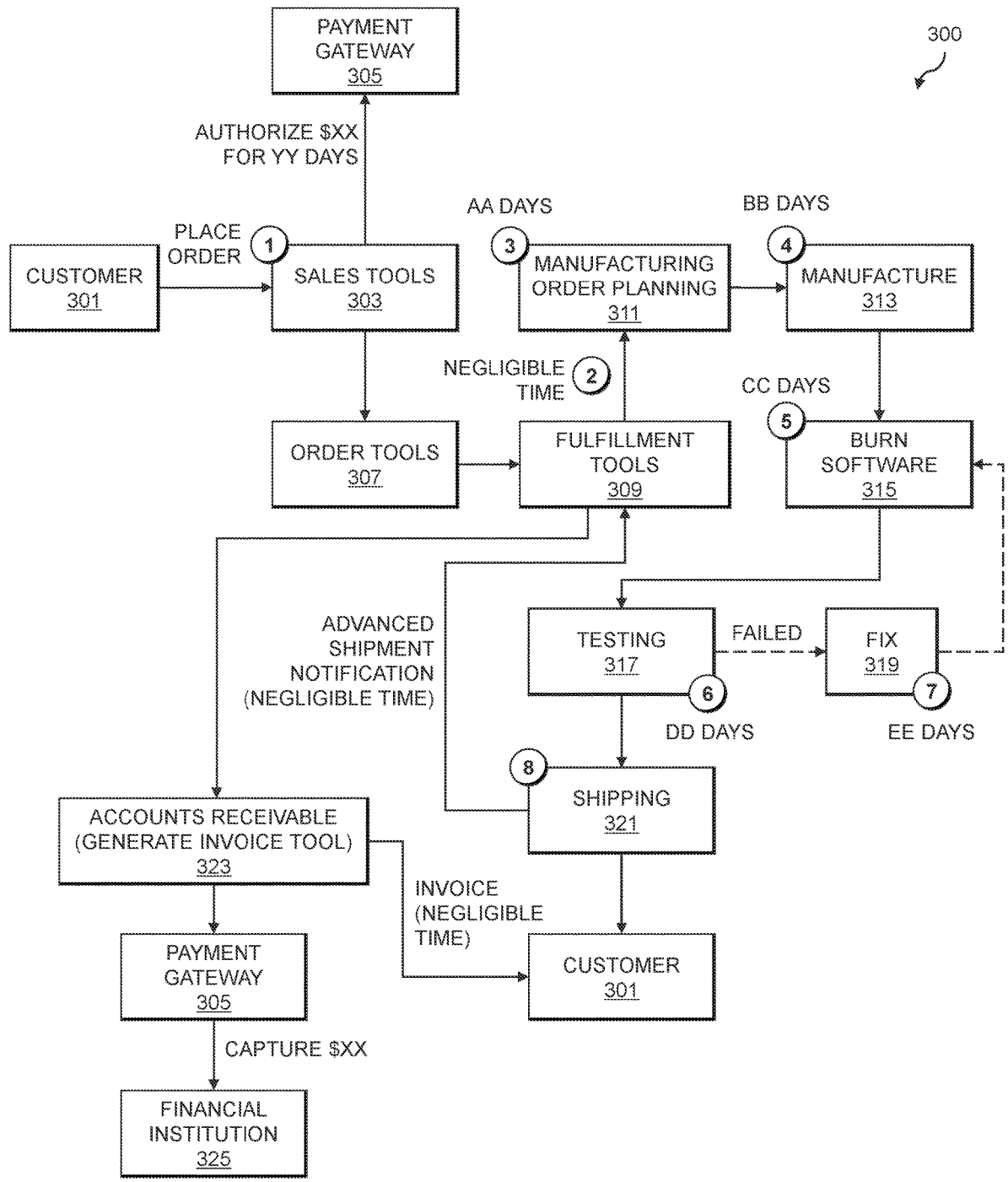
FIG. 3 shows a process flow for order fulfillment by an enterprise in an illustrative embodiment.

FIG. 3 shows an example process flow 300 for order fulfillment by an enterprise. The process flow 300 begins with a customer 301 placing in order in step 1 using one or more sales tools 303, which triggers a payment gateway 305 to authorize blocking funds for an authorization period (e.g., authorize $XX for YY days). Placing the order triggers interaction between the sales tools 303, one or more order tools 307 and one or more fulfillment tools 309 in step 2, which takes up negligible time (e.g., as compared with other portions of the process flow 300 described below such as manufacturing order planning 311, manufacture 313, burn software 315, testing 317, and fixes 319). In step 3, manufacturing order planning 311 is performed which may take AA days, followed by manufacture 313 in step 4 which may take BB days. In step 5, burn software 315 is performed which may take CC days, followed by testing 317 in step 6 which may take DD days. The testing 317 may fail, which triggers fixes 319 in step 7 which may take EE days. Following the fixes 319 in step 7, the process flow 300 returns to the burn software 315 stage. When testing 317 is successful, the process flow 300 proceeds to shipping 321 in step 8 which results in delivery to the customer 301. Shipping 321 triggers an advanced shipment notification using the fulfillment tools 309. The fulfillment tools 309, on receiving the advanced shipment notification, interact with accounts receivable (e.g., a generate invoice tool thereof) in order to generate an invoice which is provided to the customer 301. The advanced shipment notification and generation of the invoice may take negligible time (e.g., as compared with other portions of the process flow 300 described below such as manufacturing order planning 311, manufacture 313, burn software 315, testing 317, and fixes 319). The accounts receivable 323 interact with the payment gateway 305 to capture $XX from the customer's financial institution 325 (e.g., a bank, an online payment provider, etc.).

Certain parts of the process flow 300 may be major causes of delay (e.g., manufacturing order planning 311, manufacture 313, testing 317) which are responsible for payment delayed orders, because these parts of the process flow can take more time in some cases. Other parts of the process flow 300 may be addressed fast, as there are processes in place to handle such issues. Even though such parts of the process flow 300 can cause the delay in delivery, there is a lower chance that the delay results in a delivery date out of the authorization period (e.g., results in payment delayed orders).

Manufacturing order planning 311, for example, can result in delays happening due to part shortages for products to be manufactured, due to factory capacity issues due to the floor plan. Ideally, part shortages will be replenished in a maximum of two days, or using a part replacement process to use a different part from other vendors which are in stock. Factory capacity issues may normally be addressed by re-routing an order to a different manufacturing plant. Manufacture 313 can result in delays due to labor issues or plant issues, which normally get addressed in hours. Testing 317 can result in failures which cause delays, where the failures need time to troubleshoot and fix 319 (e.g., which can be a significant cause of delay, and there is no system available for assessing this). Following the fix 319, additional delay results from having to re-perform the burn software 315 and testing 317 stages which can take considerable time. In the process flow 300, the ideal order-to-invoice time depends on the total time to ship/invoice from the time when the order is placed which is equal to AA+BB+CC+DD+EE days (e.g., manufacture order planning 311, manufacture 313, burn software 315, testing 317 and fix 319), as other portions of the process flow 300 take relatively negligible time as described above. As explained above, any of these delays in different stages can cause an order to spill out of the authorization period of a payment processor (e.g., the payment gateway 305).

In some embodiments, most of the delay contribution is assumed to come from EMR process delay where the product is failed in testing 317 due to some issue in the product, and EMR is required to rectify the issue (e.g., fix 319) followed by re-burn (e.g., burn software 315) and re-testing (e.g., testing 317). The technical solutions described herein provide an intelligent process for predicting the EMR processing time for a given type of order and calculating the shipping time based on the EMR processing time. If the shipping time falls outside of the authorization period, the order may be swapped with a "lower" priority order that is on the floor (e.g., in the manufacture 313 stage) or in planning (e.g., in the manufacturing order planning 311 stage). Any other potential payment risk orders that cannot be swapped with lower priority orders are processed to get re-authorization or a new authorization with customer consent. If the re-authorization or new authorization cannot be done, the technical solutions utilize mechanisms for identifying which orders should be canceled and which should proceed, based on the customers associated with the orders.

The technical solutions described herein overcome various technical problems. Payment processors (e.g., PayPal) may provide different application programming interfaces (APIs) for e-commerce companies to use to process customer payments. E-commerce companies or other entities can use "authorize" APIs to block customer funds for a specific period of time referred to as the authorization period (e.g., 10 days) after order submission. The industry wide and recommended practice for many companies is to capture the payment within the authorization period. Unfortunately, this may not be ideal or possible in all scenarios. For manufacturing organizations (e.g., manufacturers of computing hardware), for example, this is not possible in all cases due to multiple unpredictable delay points like order journey, manufacturing processes, testing, fixing and retesting which can delay the shipment beyond the authorization period. The delayed shipment results in failure to capture payment, and these cases are picked by the collection team. If the customer refuses to pay, then the enterprise loses the money in write-offs impacting the enterprise in terms of negative revenue. There is a need for systemic solutions to address these and other issues across the industry.

In some embodiments, a payment risk orders bucket enables optimal re-authorization processes which enable the organization to follow up with customers for consent (e.g., for re-authorization or new authorization) well in advance rather than waiting until the last day of the authorization period. If consent is not received, the organization make take certain decisions to avoid loss. The payment risk orders bucket is filled with probable "payment delay orders" at the time of order itself with the authorization period expiry date. In different stages (e.g., of the process flow 300), other orders may be identified as payment delay orders and are added to the payment risk orders bucket. Orders are removed from the payment risk orders bucket once they are shipped within their associated authorization periods (e.g., before the authorization expiry time). If only a designated threshold period of time is left (e.g., 4 days, which may be pre-configured to user-defined) and the estimated shipping date is falling beyond the authorization period expiry, then mechanisms are initiated for getting consent from the customer (e.g., for re-authorization or new authorization). If re-authorization or new authorization cannot be obtained within the existing authorization period, different actions make be taken based on customer history. If, for example, a particular customer associated with a payment risk order is found to be risky, then shipment may be stopped and the order may be diverted to fixed hardware configuration stock, other priority delayed orders, or tear down to use the components in other orders. If the customer is not found to be risky (e.g., a genuine or trusted customer), then the order may be shipped after the end of the authorization period and information is given to a collection team to collect payment. It is expected that, given the technical solutions described herein, the number of orders referred to the collection team will be minimal or reduced.

In some embodiments, the technical solutions also mitigate delays resulting from EMR service level agreements (SLAs), which are a major cause of pushing orders beyond their associated authorization periods. Machine learning (ML) models may be used to predict the EMR resolution time with proper dependent factors. In some embodiments, the ML models utilize a support vector machine (SVM) algorithm and conditional distribution analysis. For a given order having a predicted EMR resolution time that is past its authorization period expiry, tools are used to find orders for the same product which have lower priority, a longer shipment time, or which are stock orders. The given order may then be "swapped" with one of such other orders by swapping service tags or other identifiers of items from the given order and the other order, and the given order is shipped with the swapped items instead of performing EMR. This results in taking the given order out of the payment risk orders bucket. If no other order is found for swapping, then the given order is kept in the payment risk orders bucket in order to request re-authorization or new authorization consent from the customer.

Figure 4:
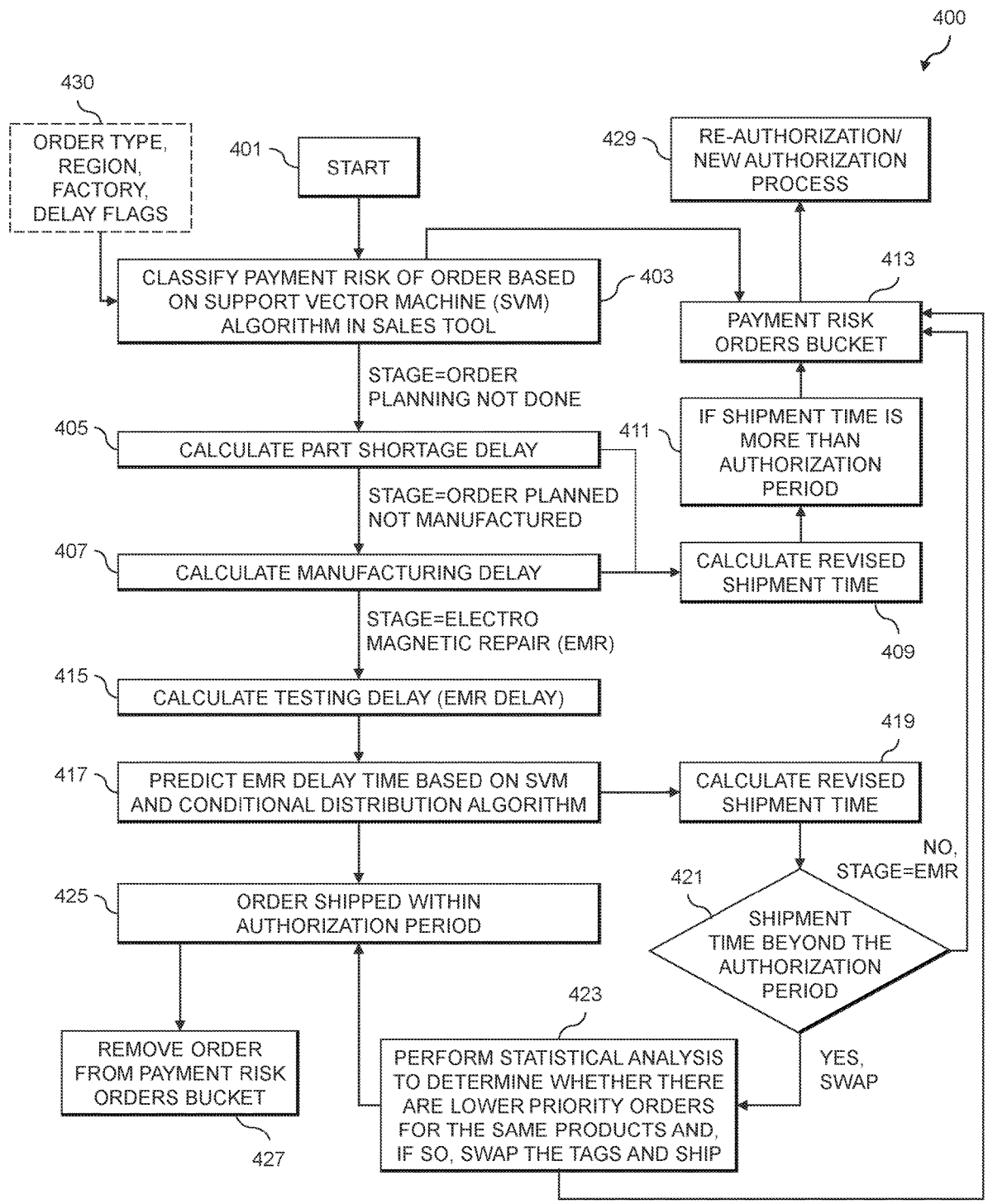
FIG. 4 shows a process flow for processing orders based on classified payment risk in an illustrative embodiment.

FIG. 4 shows a process flow 400 for processing orders based on classified payment risk. The process flow 400 starts in step 401, and an incoming order's payment risk is classified in step 403 based a SVM algorithm (e.g., implemented in the sales tools 303). The SVM algorithm may utilize various input 430, such as order type, region, factory, delay flags, etc. This may include classifying orders (e.g., non-Purchase Order (PO) orders) at the time of the orders as "payment risk orders" based on the historical delay for similar orders. Any orders classified as payment risk orders are entered into a payment risk orders bucket 413. Orders in the payment risk orders bucket 413 are watched throughout order stages which are visible to the business. The order stages include an order planning not done stage where part shortage delay is calculated in step 405, an order planned but not manufactured stage where manufacturing process delay is calculated in step 407, and an EMR stage where testing delay (e.g., EMR delay) is calculated in step 415.

When the order is in the fulfillment and order planning stage (e.g., order planning not done), part shortages are checked for in step 405. If there is a part shortage for one or more parts or components of products which are part of the order, step 405 includes checking the lead time for getting the parts or components from a supplier. The shipment time is calculated in step 409 as: Shipment Time=Supplier Lead-time+Manufacturing Time+Burn Time+Testing Time. If a determination is made that the calculated shipment time falls beyond the authorization period in step 411, the order is added to the payment risk orders bucket 413. At this point, the order is marked as being in the order planning not done stage.

In step 407, manufacturing delays are identified and used to assess the risk of order delay and the resolution lead time which may make the shipment time fall beyond the authorization period. This includes calculating the shipment time in step 409 and, if a determination is made that the calculated shipment time falls beyond the authorization period in step 411, the order is added to the payment risk orders bucket 413 (if not already present). The order is then marked as being in the order planned not manufactured stage.

In step 415, testing delay is determined. The testing delay may result from testing failures which require EMR processes to rectify, followed by re-burn and re-testing. This may include predicting EMR delay time in step 417 utilizing SVM and conditional distribution algorithms. A revised shipment time is then calculated in step 419 as: Shipment Time=EMR Predicted Time+Re-Burn Time+Re-Testing Time. In step 421, a determination is made as to whether the calculated revised shipment time is beyond the authorization period. If the result of the step 421 determination is no, the order is added to the payment risk orders bucket 413 (if not already present) and the order is marked as being in the EMR process stage. If the result of the step 421 determination is yes, the process flow 400 proceeds to swap analysis in step 423. Step 423 includes performing statistical analysis to pick one or more lower priority orders for the same products (e.g., among other orders in a factory's order pipeline which include the same products). In this context, a "lower" priority order is one which can be shipped after the revised shipment time calculated in step 419. If suitable lower priority orders are found, then the items or products in the lower priority order may be swapped into the payment risk order and shipped to meet the authorization period of the payment risk order. This may include, for example, swapping service tags or other identifiers of products in the payment risk order and the lower priority orders. If suitable lower priority orders are found in step 423, then the payment risk order can be shipped within the authorization period in step 425 and the payment risk order is removed from the payment risk orders bucket 413 in step 427. If there are no suitable lower priority orders found in step 423, the payment risk order remains in the payment risk orders bucket 413.

Orders which are in the payment risk orders bucket 413 may be monitored to determine the amount of time remaining in their associated authorization periods. If a given order in the payment risk orders bucket 413 has less than a designated threshold amount of time remaining in its authorization period, re-authorization or a new authorization process is triggered in step 429. The re-authorization or new authorization process may require obtaining consent from the customer (e.g., via an automated teleconference system, a mail-based system, etc.). If no authorization consent is received, then the customer of the given order is analyzed to predict the possibility that the customer will allow a collection team to collect payment for the order (e.g., based on the customer background including but not limited to that customer's order history). If the customer is determined to be risky, the order may be canceled and the shipment is rerouted to general inventory or repurposed for one or more existing similar orders. If the customer is determined not to be risky, then the order may be shipped to the customer and a collection team may initiate payment collection for the order.

Figure 5:
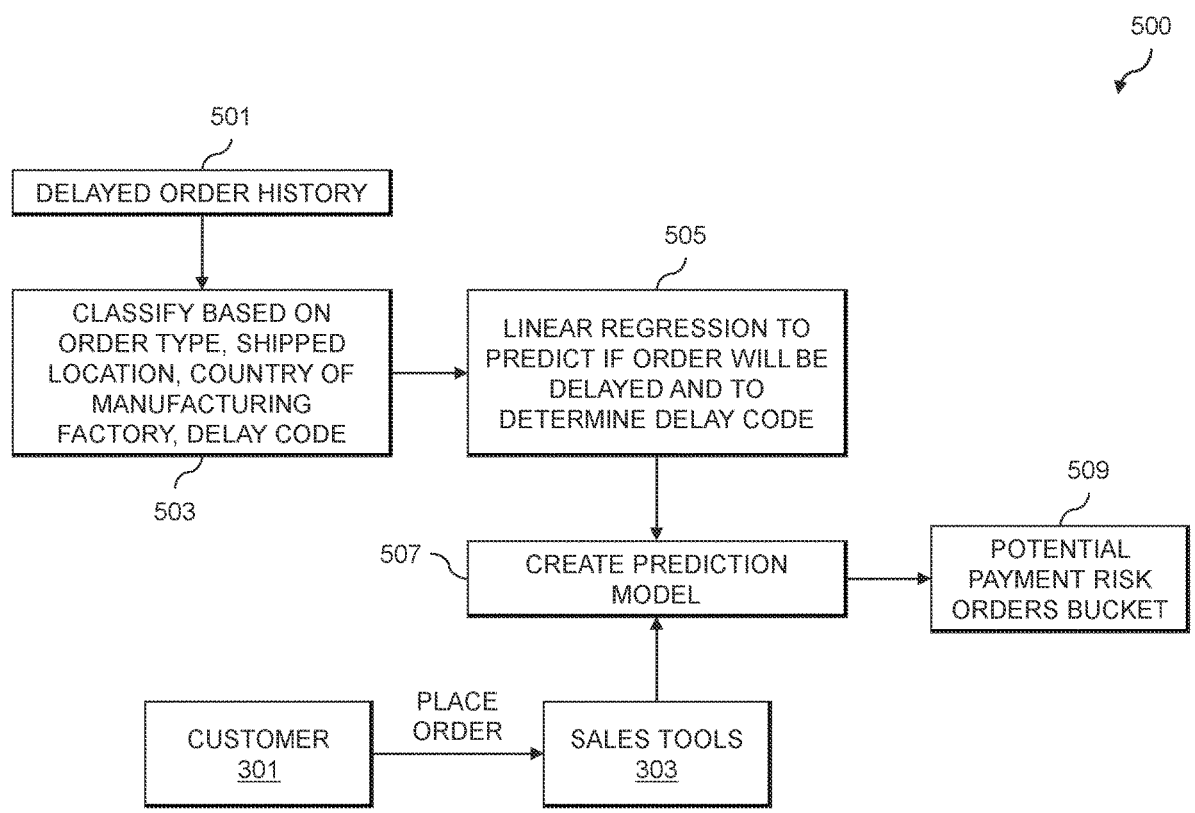
FIG. 5 shows a process flow for classifying the payment risk of an order in an illustrative embodiment.

FIG. 5 shows a process flow 500 for an enterprise to classify the payment risk of an order. Payment risk may be predicted at the time an order is placed, based on analyzing historical delayed orders. Thus, delayed order history 501 may be used as input for classifying the payment risk of orders in step 503. The payment risk may be classified based on various factors, including the type of order (e.g., product, BTO, CTO, etc.), region, manufacturing factory, the shipment location, delay codes, customer sales history with the enterprise, customer credit history, etc. In step 505, a linear regression is used to predict if orders will be delayed and to determine any applicable delay codes. This information is used to create a prediction model in step 507. When the customer 301 places an order using the sales tools 303, that order may then be analyzed using the prediction model created in step 507 to determine whether that order has a potential payment risk and belongs in a potential payment risk orders bucket 509.

Part shortage and manufacturing delays are typical reasons for delay in a manufacturing supply chain process. Various processes may be used in the order planning and manufacturing stages for calculating revised shipment or delivery dates for customer orders. Even though part shortages and manufacturing issues may delay customer orders, it is relatively infrequent that such delays will cause a customer order to go beyond the authorization period. If these delays push a customer order into the payment risk orders bucket, this may be solved through re-authorization and new authorization processes (e.g., step 429 in the process flow 400).

Testing delay (e.g., EMR delay) is an important factor which contributes to customer orders being classified as payment risk orders, as repairs or fixes (and subsequent re-burn and re-testing processes) can take several days. Rather than keeping such orders as-is, testing delay may be mitigated by swapping items in the payment risk orders with lower priority orders that are in an order planning state or an order pipeline state. Various factors may affect the EMR time, including the EMR failure type such as assembly issues and hardware issues (e.g., eject issues, LED always on, LED doesn't turn on, unable to detect dual inline memory module (DIMM), monitor replacement, Original Equipment Manufacturer (OEM) 3.0 (OA3) activation Digital Product Key (DPK) burn-in, etc.). Other factors that may affect the EMR time include EMR resource availability, EMR resource skill set, the number of units in EMR, final configuration testing lead time, etc.

Figure 6:
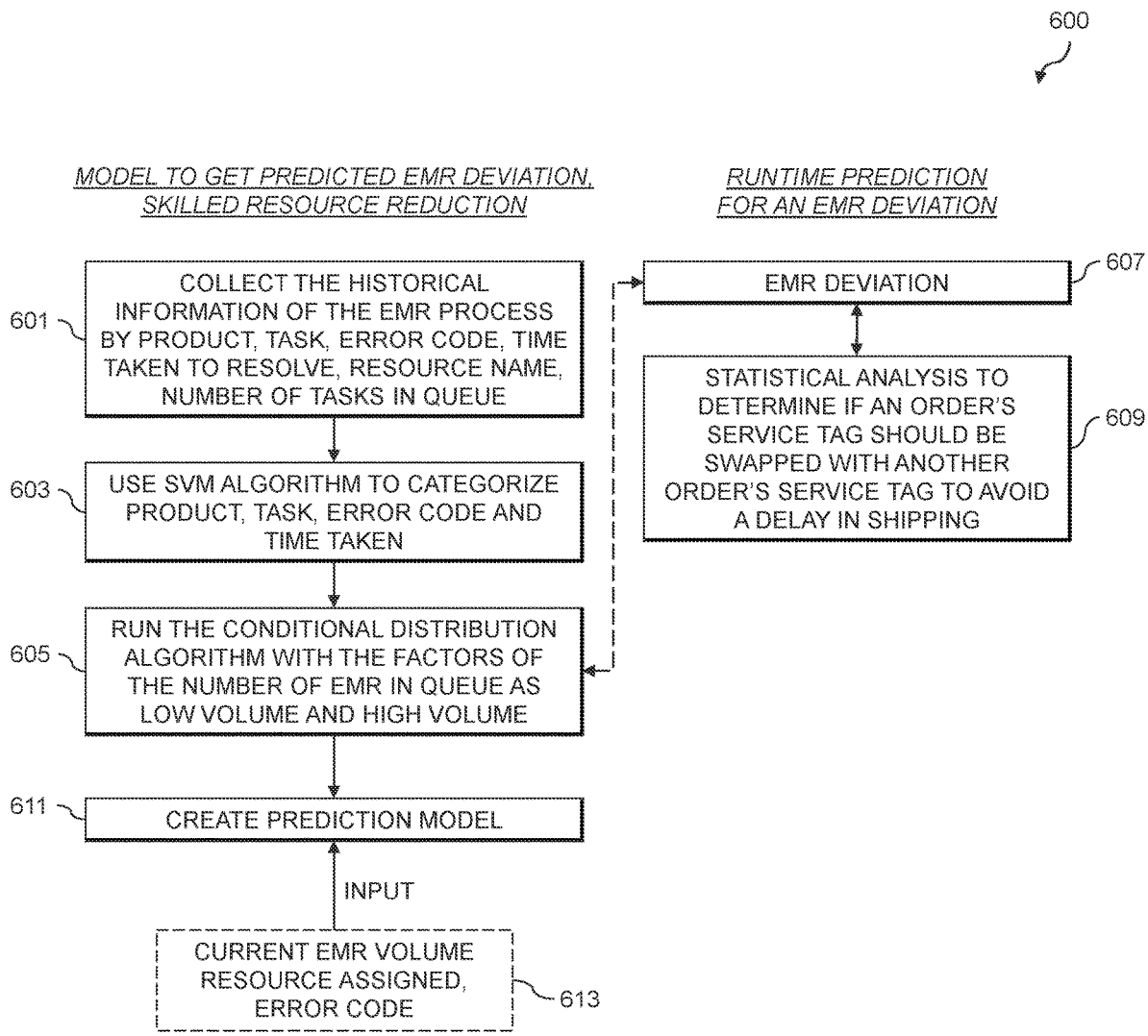
FIG. 6 shows a process flow for creating a prediction model for estimating testing delays in an illustrative embodiment.

FIG. 6 shows a process flow 600 for creating a prediction model for determining testing delays for orders. The process flow 600 includes steps for creating a model to get predicted EMR deviation and skilled resource reduction information, as well as a runtime prediction for an EMR deviation. In step 601, historical information for the EMR process is collected by various parameters, including product, task, error code, time taken to resolve, resource name, number of tasks in the EMR queue, etc. In step 603, an SVM algorithm is used to categorize the product, task, error code and time taken. A conditional distribution algorithm is run in step 605 with factors of the number of tasks in the EMR queue which are considered "low" and "high" volume (e.g., which may be predefined or user-configured). EMR deviation is determined in step 607, which includes performing statistical analysis in step 609 to determine if a first order's service tag or other identifier should be swapped with a second order's service tag to avoid a delay in shipping of the first order. Such information is used to create a prediction model in step 611. The prediction model created in step 611 may then be run based on input 613 including the current EMR volume, resources assigned, and error code for a given order.

If ((System Time−Order Time)+Predicted EMR Time) >Authorized Expiry Time for a given order, then the given order is classified as a payment risk order. Processing is then performed to look for relatively lower priority orders with items that can be swapped for items in the given order to mitigate the payment risk issue. Lower priority orders that can be considered for swapping include, by way of example: other orders with the one or more of the same items as the given order but which have a longer customer delivery or shipment date than the given order; other orders with one or more of the same items in the EMR section with a shorter EMR time and a longer shipment date; stock orders; etc. Once potential swap orders are identified, an appropriate one is selected for swapping service tags (or other identifiers) with the given order that has the payment risk. In this way, the technical solutions are able to eliminate orders with potential nonpayment and improve overall order fulfillment by an enterprise.

Once an order is shipped inside its authorization period, that order is removed from the payment risk orders bucket. If there are still orders left in the payment risk orders bucket and there is less than a designated threshold amount of time remaining in their associated authorization periods, such orders are subject to re-authorization or new authorization processes. The payment risk orders bucket enables an enterprise to start the process of engaging with the right customers for new authorization consent well in advance of expiration of the authorization period—there is no need to wait until the last moment.

Figure 7:
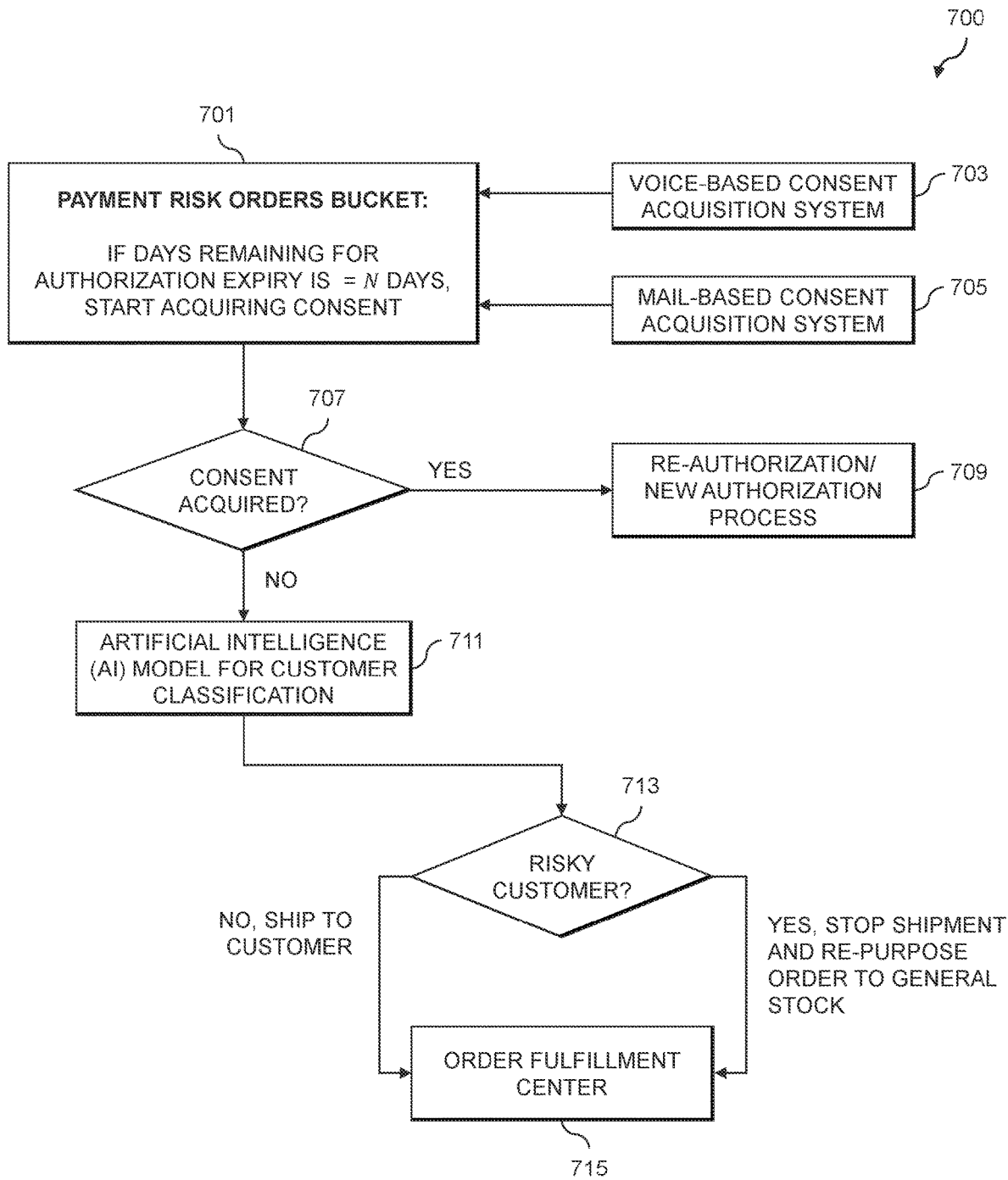
FIG. 7 shows a process flow for initiating re-authorization or new authorization for payment risk orders in an illustrative embodiment.

FIG. 7 shows a process flow 700 for initiating re-authorization or new authorization for payment risk orders. The process flow 700 begins with analyzing orders which are part of a payment risk orders bucket in step 701, and initiating re-authorization or new authorization processes for orders in the payment risk orders bucket having authorization periods expiring within N days (e.g., N=5). Various mechanisms may be used for initiating re-authorization or new authorization for orders in the payment risk orders bucket. FIG. 7 shows two examples—a voice-based consent acquisition system 703 (e.g., used to initiate an automatic teleconference with a customer to obtain consent for re-authorization or new authorization) and a mail-based consent acquisition system 705 (e.g., used to initiate electronic mail or other mail-based communication with a customer to obtain consent for re-authorization or new authorization). In step 707, a determination is made as to whether consent has been acquired (e.g., via the voice-based consent acquisition system 703 or the mail-based consent acquisition system 705) for re-authorization or new authorization for a given order in the payment risk orders bucket. If the result of the step 707 determination is yes, the process flow 700 proceeds with the re-authorization or new authorization process for the given order in step 709. The re-authorization or new authorization process in step 709 results in the customer funds being blocked for an extended authorization period (e.g., 10 more days), giving the enterprise more time to capture the payment and ship the products that are in the given order.

If the result of the step 707 determination is no (e.g., authorization is not completed or the customer of the given order did not give consent in time), the process flow 700 proceeds with artificial intelligence (AI) model-based classification of the customer of the given order in step 711 to determine whether or not to ship the given order to the customer after expiration of the authorization period. The AI model-based customer classification in step 711 includes classifying the customer of the given order based on various factors, including the customer's history with the enterprise. The AI model classifies the customer as risky or non-risky based on that customer's prior engagement with the enterprise, credit score, etc. The output classification from the AI model is used in step 713 to determine whether the customer of the given order is risky or not. If the result of the step 713 determination is yes (e.g., that the customer is risky), then the process flow 700 instructs the enterprise's order fulfillment center 715 to stop shipment and re-purpose items in the given order to general stock (e.g., for fulfilling other orders, for swapping with other payment risk orders, etc. to save potential loss). If the result of the step 713 determination is no (e.g., that the customer is not risky), then the process flow 700 instructs the enterprise's order fulfillment center 715 to ship the given order to the customer outside its authorization period. The given order may be marked for collection of payment later (e.g., by an enterprise or third-party collection team) in the case of payment capture failure.

Figure 8:
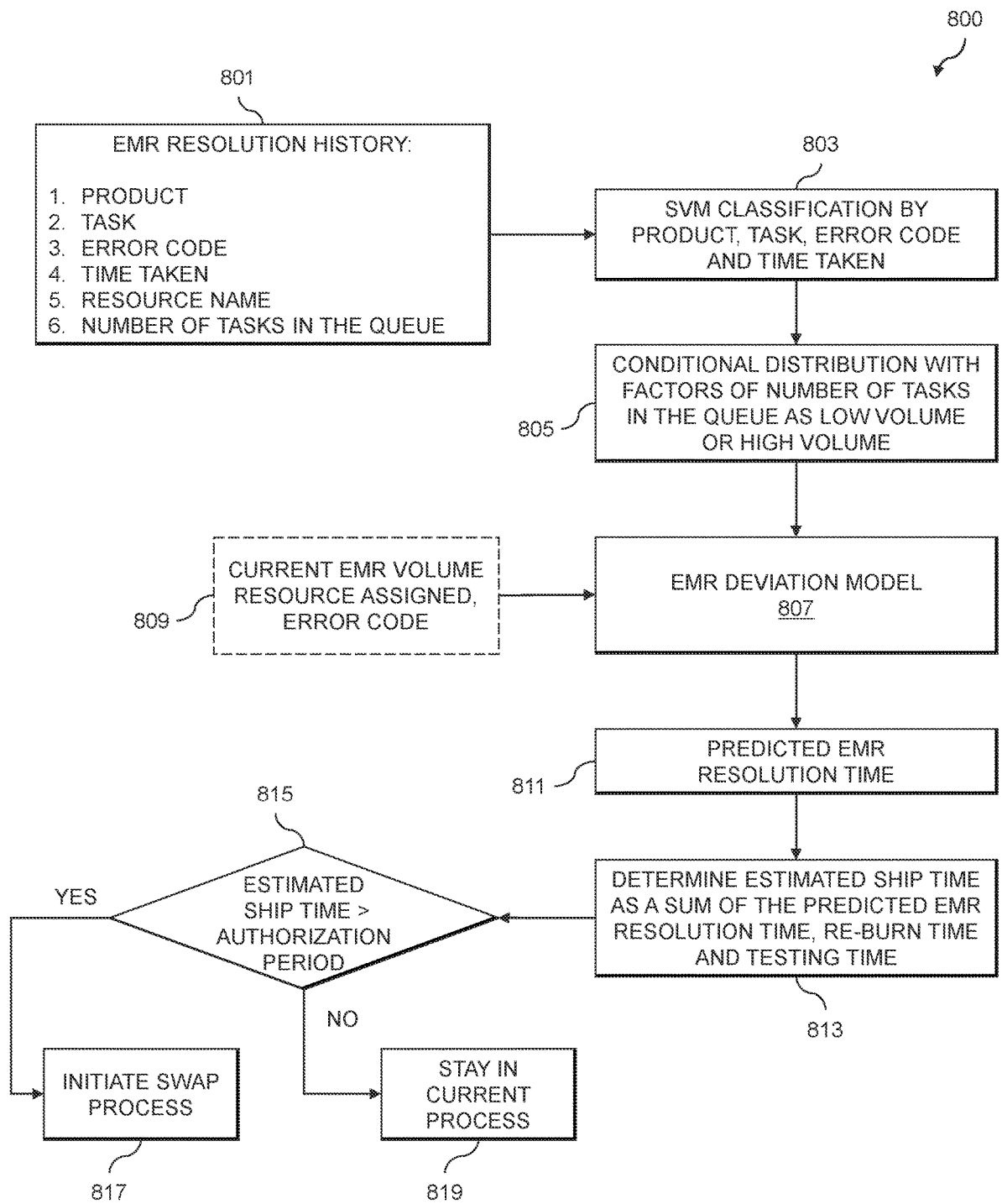
FIG. 8 shows a process flow for predicting electro-magnetic repair time and determining how to handle orders based on the predicted electro-magnetic repair time in an illustrative embodiment.

FIG. 8 shows a process flow 800 for EMR time prediction and determining whether to initiate a swap process or not. The EMR time prediction depends on many factors, from assembly issues to hardware issues. One important factor that is observed which affects the EMR time predication includes the skill set (e.g., of the personnel performing EMR) and resource availability for EMR. Another important factor is the number of units in the EMR Queue. The process flow 800 starts with EMR resolution history information 801, which includes factors such as the product, task, error code, time taken, resource name, and number of tasks in the EMR queue. The EMR resolution history information 801 is used for performing SVM classification in step 803 based on the product, task, error code and time taken factors. In step 805, a conditional distribution is determined based on the number of tasks in the EMR queue factor (e.g., to characterize as either low or high volume). An EMR deviation model 807 is then run, which takes as input 809 parameters such as the current EMR volume, resources assigned and error code for a given order. The output of the EMR deviation model 807 is a predicted EMR resolution time 811. In step 813, an estimated ship time is determined based at least in part on the predicted EMR resolution time (EMR time). In some embodiments, the estimated ship time=EMR time+Re-Burn time+Re-Testing Time. In step 815, a determination is made as to whether the estimated ship time for a given order exceeds the authorization period for the given order. If the result of the step 815 determination is yes, the process flow 800 initiates a swap process in step 817. If the result of the step 815 determination is no, the process flow 800 stays in its current process in step 819 (e.g., which may result in initiating re-authorization or new authorization as described elsewhere herein).

Figure 9:
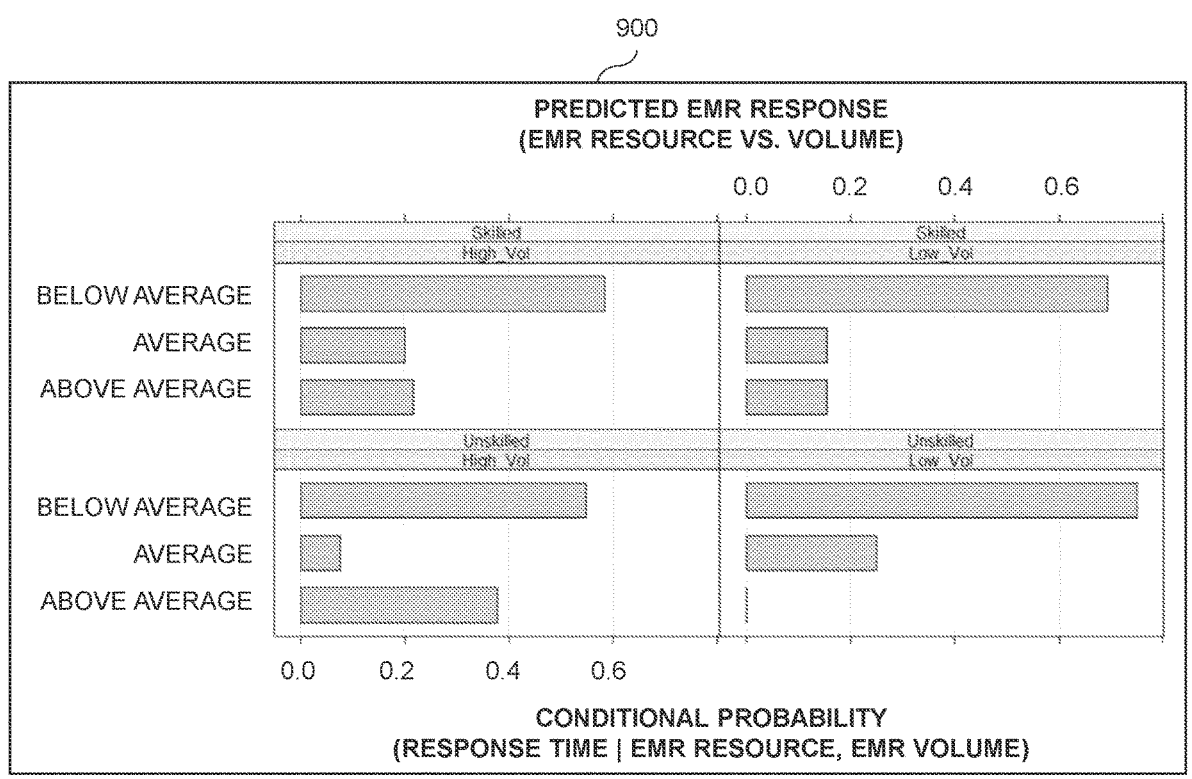
FIG. 9 shows a plot of conditional probability based on skill set and number of tasks in an electro-magnetic repair queue in an illustrative embodiment.

It is observed that the skills required to solve EMR issues as well as the volume of tasks in the EMR queue are driving dependent factors in the EMR resolution time. Thus, on top of the SVM classification in step 803, the process flow 800 uses conditional distribution in step 805 to fine-tune the prediction with factors of the skill set and EMR volume. FIG. 9 shows a plot 900 illustrating the predicted EMR response time (e.g., EMR resource vs. volume) and conditional probability (e.g., EMR response time as a function of EMR resource and volume) for skilled and unskilled personnel and high and low volumes of EMR tasks. The conditional probability is used for a decision tree algorithm to determine which orders should be swapped and, for orders which cannot be swapped and for which a risky customer does not given consent for re-authorization or new authorization, whether to divert the order to general stock, to use items for other delayed orders, or for tearing the products down to use parts or components thereof for other orders.

The technical solutions described herein provide systems for mitigation of payment loss risk using EMR resolution time prediction as well as swapping of items or products from lower priority orders (e.g., with longer shipment dates than a payment risk order). The technical solutions also implement a payment risk orders bucket that enables an entity to follow-up with customers for payment risk orders to obtain consent for re-authorization or new authorization in advance of expiration of the authorization periods of the payment risk orders. The technical solutions thus enable optimal or improved decision-making processes, including in situations where consent for re-authorization or new authorization is not obtained from customers in time to reduce the potential loss to the provider organization or entity.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for order processing based on predicted delay time to increase likelihood of order fulfillment within an authorization period will now be described in greater detail with reference to FIGS. 10 and 11. Although described in the context of system 100, these platforms may also be used to implement at least portions of other information processing systems in other embodiments.

Figure 10:
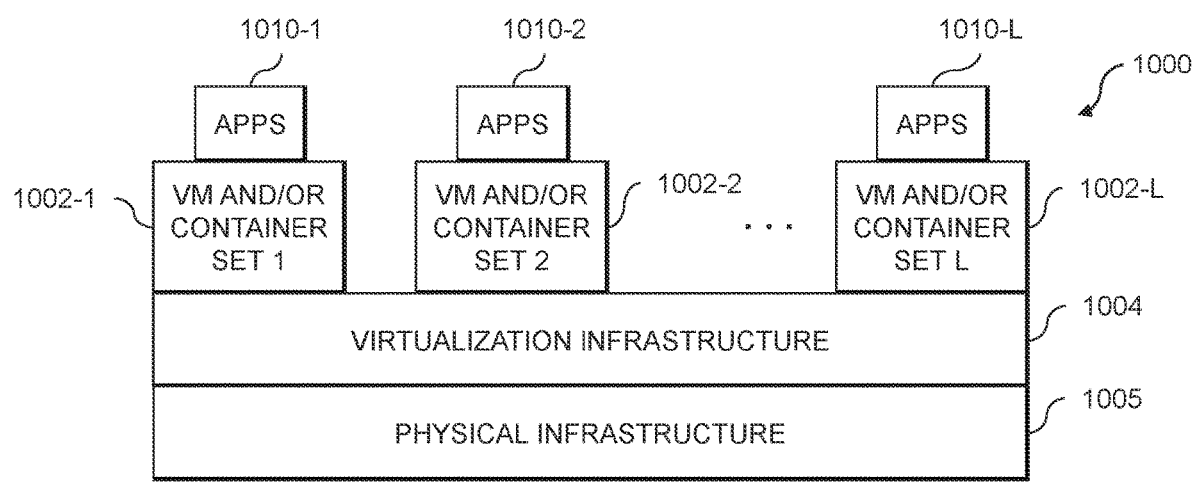
FIGS. 10 and 11 show examples of processing platforms that may be utilized to implement at least a portion of an information processing system in illustrative embodiments.
Figure 11:
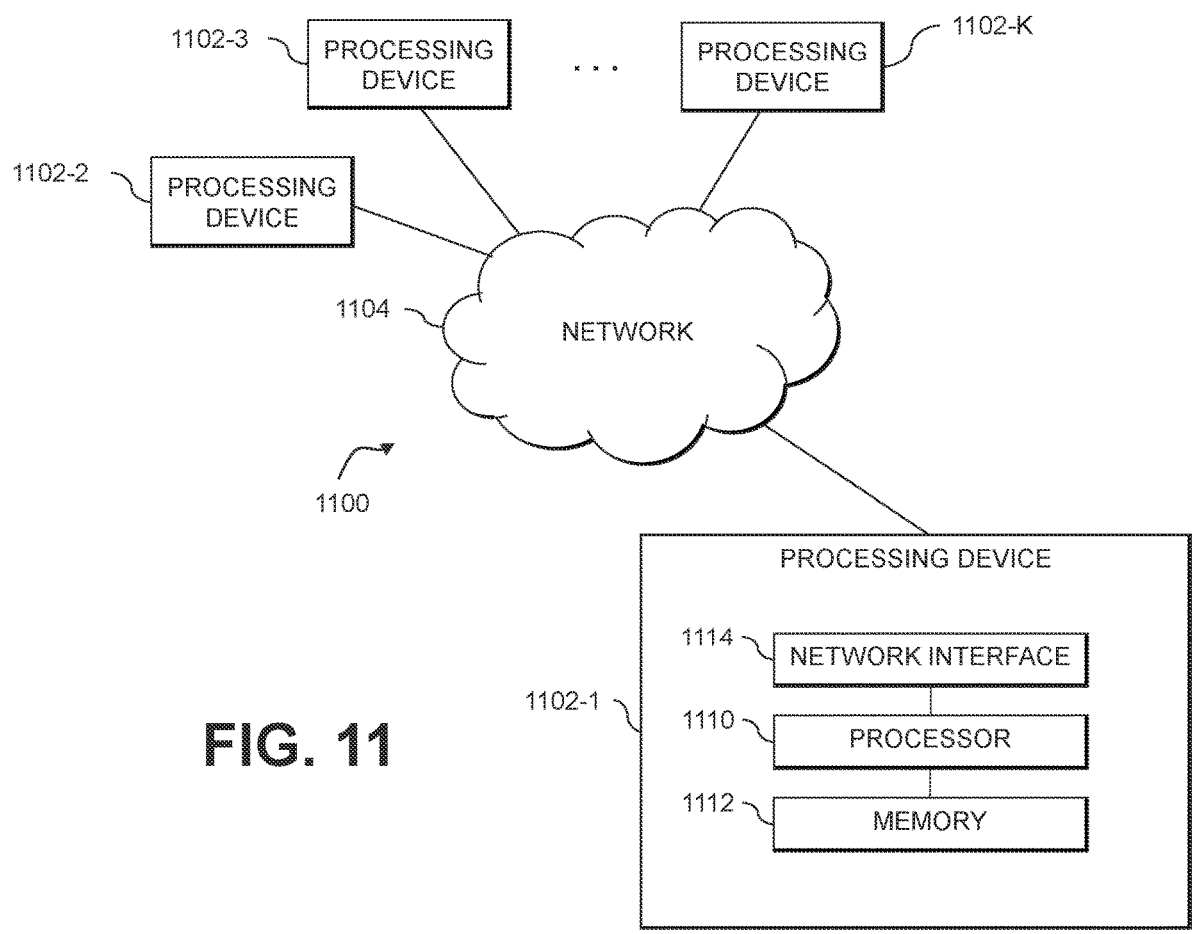

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for order processing based on predicted delay time to increase likelihood of order fulfillment within an authorization period as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, ML models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to identify a given order for one or more products to be manufactured by an entity, the given order being associated with an authorization period specifying a time in which the given order is to be fulfilled by the entity to initiate capture of blocked funds of a customer that placed the given order;
to determine deviations in at least one of testing and repair time for different ones of the one or more products;

to train a first machine learning model utilizing the determined deviations in the at least one of the testing and the repair time for the different ones of the one or more products;

to determine whether the given order has at least a threshold likelihood of being delayed utilizing the first machine learning model;

responsive to the given order having at least the threshold likelihood of being delayed, to predict a delay time of the given order utilizing a second machine learning model;

to determine whether the predicted delay time of the given order will result in the given order being fulfilled outside of its associated authorization period; and responsive to determining that the predicted delay time of the given order will result in the given order being fulfilled outside of its associated authorization period, to initiate one or more actions to at least one of reduce the predicted delay time of the given order and extend the authorization period associated with the given order;

wherein initiating the one or more actions comprises attempting at least one action to reduce the predicted delay time prior to attempting at least one action to extend the authorization period associated with the given order.

2. The apparatus of claim 1 wherein the one or more products comprises one or more computing devices.

3. The apparatus of claim 1 wherein the first machine learning model is further trained utilizing delayed order history information characterizing one or more of order type, shipment location, country of manufacturing factory, and delay codes.

4. The apparatus of claim 1 wherein determining whether the given order has at least the threshold likelihood of being delayed is based at least in part on determining delay attributed to issues relating to at least one of manufacturing order planning and manufacturing.

5. The apparatus of claim 1 wherein determining whether the given order has at least the threshold likelihood of being delayed is based at least in part on determining delay attributed to testing of the one or more products manufactured by the entity.

6. The apparatus of claim 5 wherein the delay attributed to the testing of the one or more products manufactured by the entity comprises delays associated with electro-mechanical repair of one or more issues identified during the testing of the one or more products manufactured by the entity.

7. The apparatus of claim 6 wherein the delays associated with the electro-mechanical repair of the one or more issues is based at least in part on at least one of electro-mechanical repair failure type, electro-mechanical repair resource availability, skill set of users performing the electro-mechanical repair, and a number of products in an electro-mechanical repair queue.

8. The apparatus of claim 1 wherein the second machine learning model utilizes (i) a support vector machine algorithm for classifying of the given order based at least in part on product, electro-mechanical repair task, one or more error codes, and time taken factors and (ii) conditional probability analysis for determining electro-mechanical repair time deviation based at least in part on a number of electro-mechanical repair tasks in an electro-mechanical repair queue.

9. The apparatus of claim 1 wherein the at least one action to reduce the predicted delay time comprises swapping one or more products of the given order with one or more similar products in one or more additional orders having associated authorization periods which end later than the authorization period of the given order.

10. The apparatus of claim 1 wherein the at least one action to reduce the predicted delay time comprises swapping, in an electro-mechanical repair queue, an ordering of one or more electro-mechanical repair tasks of the given order with one or more electro-mechanical repair tasks of one or more additional orders having associated authorization periods which end later than the authorization period of the given order.

11. The apparatus of claim 1 wherein the at least one action to extend the authorization period associated with the given order comprises requesting consent from the customer of the given order to extend the authorization period of the given order.

12. The apparatus of claim 1 wherein, responsive to failure of the one or more actions to at least one of reduce the predicted delay time and extend the authorization period associated with the given order, the at least one processing device is configured to utilize a third machine learning model for classifying a riskiness of the customer based at least in part on the customer's order history with the entity.

13. The apparatus of claim 12, wherein:

responsive to the classified riskiness of the customer being a first risk level, canceling the given order; and responsive to the classified riskiness of the customer being a second risk level, fulfilling the given order outside its associated authorization period.

14. A computer program product comprising a non-transitory processor-readable storage medium having stored therein program code of one or more software programs, wherein the program code when executed by at least one processing device causes the at least one processing device:

to identify a given order for one or more products to be manufactured by an entity, the given order being associated with an authorization period specifying a time in which the given order is to be fulfilled by the entity to initiate capture of blocked funds of a customer that placed the given order;

to determine deviations in at least one of testing and repair time for different ones of the one or more products;

to train a first machine learning model utilizing the determined deviations in the at least one of the testing and the repair time for the different ones of the one or more products;

to determine whether the given order has at least a threshold likelihood of being delayed utilizing the first machine learning model;

responsive to the given order having at least the threshold likelihood of being delayed, to predict a delay time of the given order utilizing a second machine learning model;

to determine whether the predicted delay time of the given order will result in the given order being fulfilled outside of its associated authorization period; and responsive to determining that the predicted delay time of the given order will result in the given order being fulfilled outside of its associated authorization period, to initiate one or more actions to at least one of reduce the predicted delay time of the given order and extend the authorization period associated with the given order;

wherein initiating the one or more actions comprises attempting at least one action to reduce the predicted delay time prior to attempting at least one action to extend the authorization period associated with the given order.

15. The computer program product of claim 14 wherein the at least one action to reduce the predicted delay time comprises at least one of:
   swapping one or more products of the given order with one or more similar products in one or more additional orders having associated authorization periods which end later than the authorization period of the given order; and
   swapping, in an electro-mechanical repair queue, an ordering of one or more electro-mechanical repair tasks of the given order with one or more electro-mechanical repair tasks of one or more additional orders having associated authorization periods which end later than the authorization period of the given order.

16. The computer program product of claim 14 wherein the program code when executed by the at least one processing device further causes the at least one processing device, responsive to failure of the one or more actions to at least one of reduce the predicted delay time and extend the authorization period associated with the given order, to utilize a third machine learning model for classifying a riskiness of the customer based at least in part on the customer's order history with the entity.

17. A method comprising:
   identifying a given order for one or more products to be manufactured by an entity, the given order being associated with an authorization period specifying a time in which the given order is to be fulfilled by the entity to initiate capture of blocked funds of a customer that placed the given order;
   determining deviations in at least one of testing and repair time for different ones of the one or more products;
   training a first machine learning model utilizing the determined deviations in the at least one of the testing and the repair time for the different ones of the one or more products;
   determining whether the given order has at least a threshold likelihood of being delayed utilizing the first machine learning model;
   responsive to the given order having at least the threshold likelihood of being delayed, predicting a delay time of the given order utilizing a second machine learning model;
   determining whether the predicted delay time of the given order will result in the given order being fulfilled outside of its associated authorization period; and
   responsive to determining that the predicted delay time of the given order will result in the given order being fulfilled outside of its associated authorization period, initiating one or more actions to at least one of reduce the predicted delay time of the given order and extend the authorization period associated with the given order;
   wherein initiating the one or more actions comprises attempting at least one action to reduce the predicted delay time prior to attempting at least one action to extend the authorization period associated with the given order; and
   wherein the method is performed by at least one processing device comprising a processor coupled to a memory.

18. The method of claim 17 wherein the at least one action to reduce the predicted delay time comprises at least one of:
   swapping one or more products of the given order with one or more similar products in one or more additional orders having associated authorization periods which end later than the authorization period of the given order; and
   swapping, in an electro-mechanical repair queue, an ordering of one or more electro-mechanical repair tasks of the given order with one or more electro-mechanical repair tasks of one or more additional orders having associated authorization periods which end later than the authorization period of the given order.

19. The method of claim 17 further comprising, responsive to failure of the one or more actions to at least one of reduce the predicted delay time and extend the authorization period associated with the given order, utilizing a third machine learning model for classifying a riskiness of the customer based at least in part on the customer's order history with the entity.

20. The method of claim 19, wherein:
   responsive to the classified riskiness of the customer being a first risk level, canceling the given order; and
   responsive to the classified riskiness of the customer being a second risk level, fulfilling the given order outside its associated authorization period.

* * * * *